United States Patent [19]

Huether et al.

[11] Patent Number: 5,565,745
[45] Date of Patent: Oct. 15, 1996

[54] COMMUNICATIONS PROTOCOL

[76] Inventors: James L. Huether, 7375 Rollingdell Dr. #55, Cupertino, Calif. 95014; Unnikrishnan Pillai, 18 Kraus Grill, San Francisco, Calif. 94133; Daniel L. Yee, 1419 Crestwood Dr., South San Francisco, Calif. 94080

[21] Appl. No.: 177,815

[22] Filed: Jan. 4, 1994

[51] Int. Cl.$^6$ ........................................ H04B 1/66
[52] U.S. Cl. .................. 375/377; 375/272; 345/8; 370/85.11; 370/94.1
[58] Field of Search .................. 375/8, 7, 121, 375/219, 220, 222, 377; 345/8; 370/85.11, 94

[56] References Cited

U.S. PATENT DOCUMENTS

| | | | |
|---|---|---|---|
| 4,486,750 | 12/1984 | Aoki | 370/91 |
| 4,536,759 | 8/1985 | DiMassimo et al. | 340/717 |
| 4,782,498 | 11/1988 | Copeland, III | 375/222 |
| 5,339,395 | 8/1994 | Pickettet | 370/91 X |

*Primary Examiner*—Young T. Tse
*Attorney, Agent, or Firm*—Skjerven, Morrill, MacPherson, Franklin & Friel; David T. Millers

[57] ABSTRACT

A protocol for communication between devices connected via a bus having three handshake lines and at least one data line. A first device controls two of the three handshake lines, and a second device controls the third. The first device mixes toggling of the first and second handshake lines in a pattern which identifies a type of information packet. The second device polls the first and second handshake lines, and from the toggling pattern identifies the packet type. Once identified, the packet is transmitted according to a predefined format for the type. Typically, transmission of information is completed asynchronously using the handshake lines to carry request and acknowledge signals. In one embodiment, the protocol is implemented in a virtual reality system having a video game console as a first device and a head mounted display as the second device.

16 Claims, 4 Drawing Sheets

COMMUNICATIONS PROTOCOL

CROSS-REFERENCE TO RELATED APPLICATIONS

This application is related to, and incorporates by reference, commonly owned U.S. patent application Ser. No. 08/177,664 entitled "Stereoscopic/Monoscopic Video Display System," attorney docket No. M-2575, filed on the same date as the present application.

BACKGROUND OF THE INVENTION

1. Field of the Invention

This invention relates to methods for communicating information in a system including a computer or game console and a remote device.

2. Description of Related Art

Virtual reality systems use specialized input and output devices that allow computer programs to produce more realistic simulations. Typically such systems include sensors mounted on the body of a user to sense body motion. For example, a "headtracker" worn on the head of a user senses the user's head movement or orientation. A computer program receives from the headtracker information indicating the direction the user is facing, then generates a video image appropriate to that direction. The virtual reality system may also include a head mounted stereoscopic display with which the computer communicates to provide stereoscopic views to the user.

Because of the unique communication requirements of a virtual reality system, a communication protocol optimized for virtual reality systems and allowing information transmission with a minimum of number of communications lines is needed.

SUMMARY OF THE INVENTION

In accordance with the present invention, a communications protocol is provided for communication between devices connected via a bus. The bus includes three handshake lines and at least one data line. In one embodiment of the invention, a first device controls two of the three handshake lines, and a second device controls the third. To transfer information, the first device toggles the voltage on the first handshake line and toggles the voltage on the second handshake line according to a pattern which identifies a desired type of information packet. Toggling means changing the voltage on a line from one state to another, for example, either from high to low or from low to high. The second device polls the first and second handshake lines, and each time the first or second handshake line is toggled, sends an acknowledge signal by toggling the third handshake line. Once the toggling pattern has identified a type of information packet, transmission of information on the data lines begins according to a predefined format for the identified packet. Typically, transmission of information is completed asynchronously using the handshake lines to carry request and acknowledge signals.

In one protocol in accordance with the invention, the toggling patterns and the information packet formats are chosen so that the voltages on the handshake lines start and end information transmission in a predefined idle state. Typically, the protocol only toggles one handshake line at a time, and therefore prevents errors that result from misinterpretation of simultaneous changes in voltage.

The protocol is well suited for use in a virtual reality system wherein the first device is a main console (such as a computer or a video game console) and the second device is a remote device (such as a head mounted display or a body motion sensor). Most digital information flow in such virtual reality systems is from the remote device to the main console, but the main console indicates the information that is required. With a protocol according to the present invention, two handshake lines are sufficient for the main console to indicate the information required. All other lines of the bus can be configured for input to the main console. Accordingly, a high proportion of the available lines are configured for the most common direction of information flow. For most information transfers, the main console identifies the desired information, and the information is transferred without reconfiguring the data flow directions.

DETAILED DESCRIPTION OF THE PREFERRED EMBODIMENTS

Figure 1:
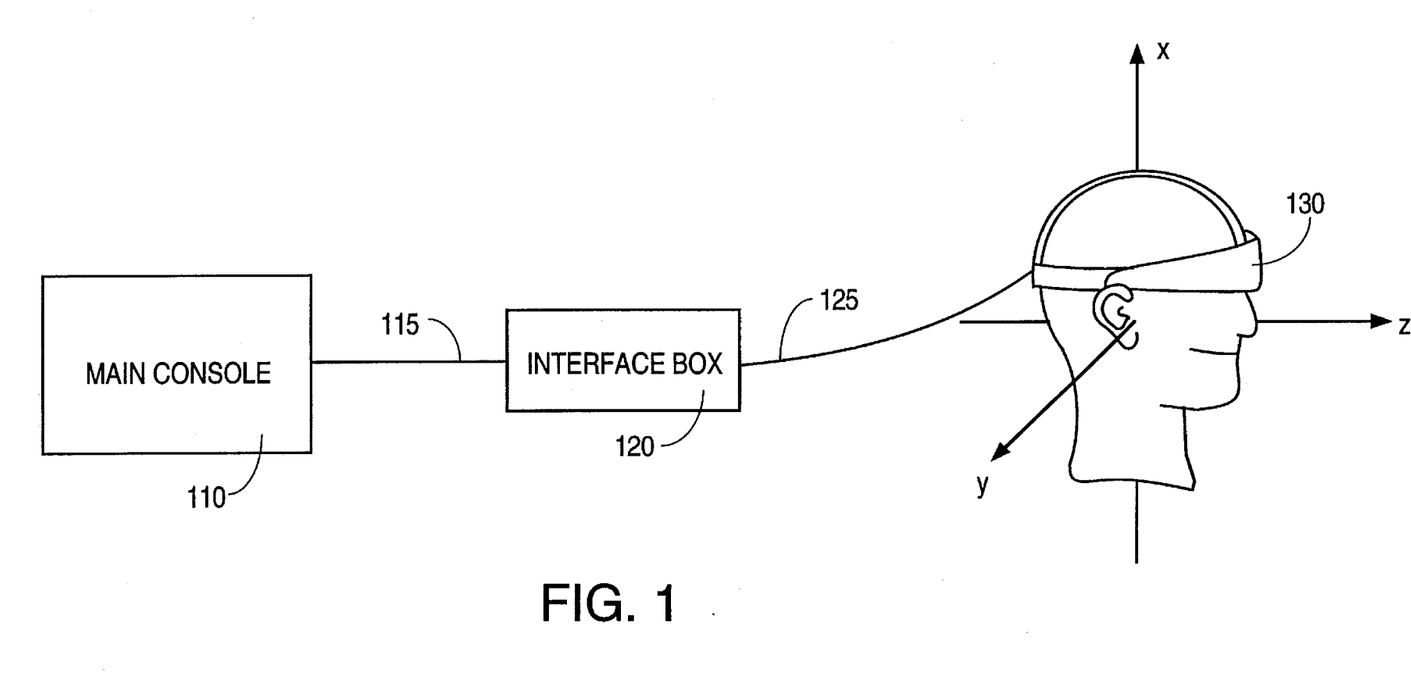
FIG. 1 shows a virtual reality system which includes a main console, an interface box and a head mounted display worn by a user of the virtual reality system.

FIG. 1 shows a virtual reality system which includes a main console 110, interface box 120, and a head mounted display (HMD) 130 being worn by a user of the virtual reality system. Main console 110 is a computer or a video game console such as a SEGA GENESIS™ video game console executes a virtual reality program which typically uses information concerning the position of the user's head to generate an image representing the virtual view in the direction that the user is facing.

HMD 130 contains a stereoscopic display and sensors for measuring the orientation of the user's head. Sensors in HMD 130 sense the orientation of the user's head by measuring position angles about three axis, an X axis which points up, a Y axis which is horizontal and perpendicular to the direction the user is facing, and a Z axis which is perpendicular to the X and Y axis. For X axis position angles, the sensor may use a flux gate magnetometer which senses an angle relative to the earths magnetic field. For Y and Z axis position angles, the sensor may use tilt meters which sense angles relative to the direction of gravity. Suitable sensing system for a virtual reality system are well known in the art.

In some embodiments, HMD 130 or interface box 120 includes a timer which measures how long HMD 130 has been in use. Such a timer may indicate when to shut down the virtual reality system for safety reasons if HMD 130 has been in use so long that the user is at risk of becoming disoriented. In addition to interface box 120 and HMD 130, the virtual reality system may include additional remote devices such a joystick or gloves that sense hand motion or apply pressure to finger tips to provide tactile input or output.

Interface box 120 is a junction box and a convenient location for placing circuits needed for communication to/from other remote devices. In the embodiment of FIG. 1, the interface box 120 includes a microprocessor that executes a program which handles data transfers between main console 110 and remote devices such as HMD 130. In alternative embodiments, interface box 120 is eliminated, and all circuitry is placed either in main console 110, HMD 130, or other remote devices (not shown).

Figure 2:
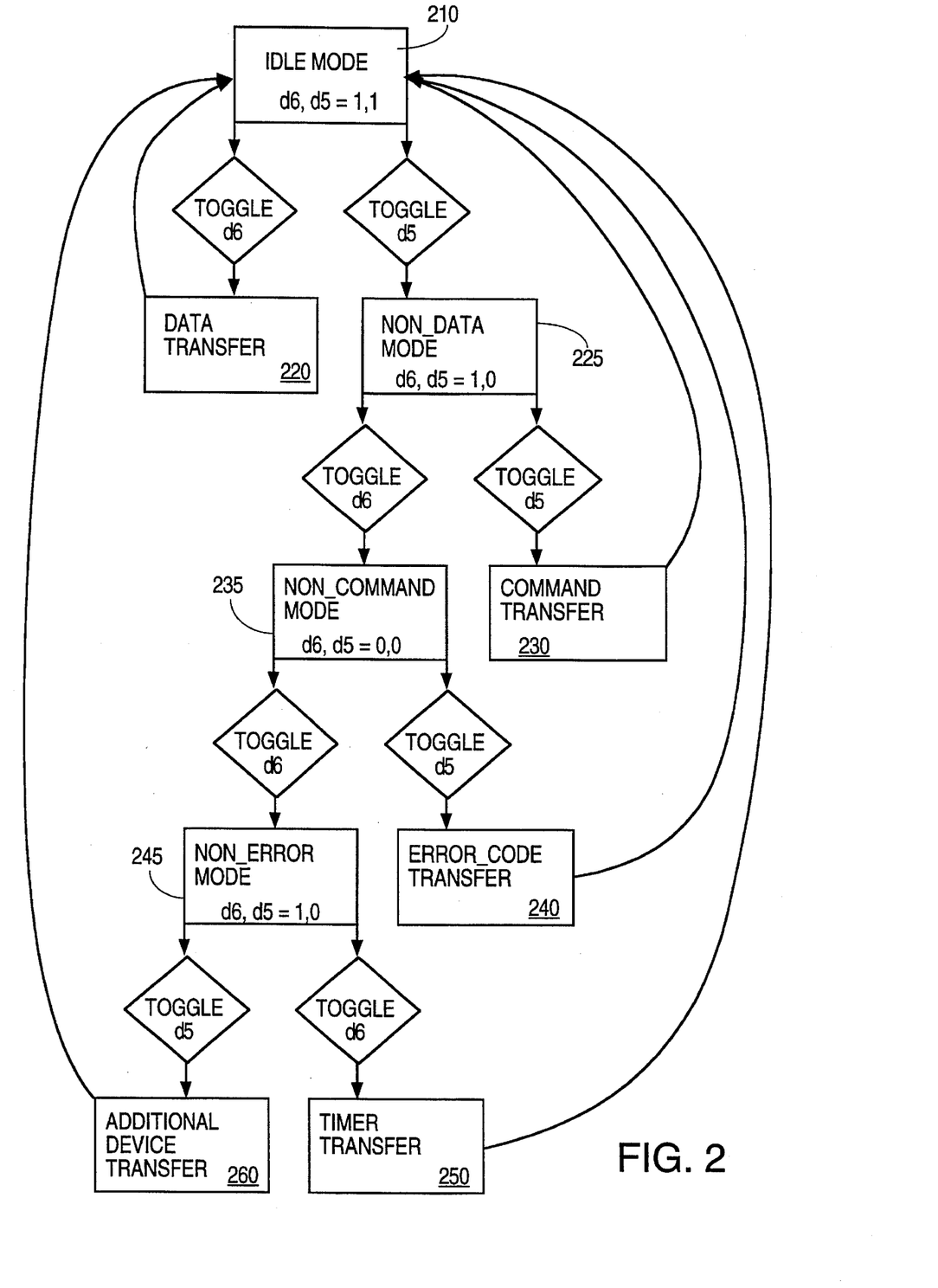
FIG. 2 shows a flow diagram of a method for identifying types of information transfers in accordance with the present invention.

During operation different types of information are transferred between main console 110 and the remote devices. The transferred information can be organized into a few types of predefined defined packets, each packet having a fixed format. FIG. 2 shows a flow diagram of a protocol in accordance with the present invention. Included in FIG. 2 are transfers of predefined data packets used in a virtual reality system such as the system shown in FIG. 1 or the system disclosed in the above-referenced U.S. patent application entitled "Stereoscopic/Monoscopic Video Display System."

In FIG. 2, the transfers include data transfer 220, command transfer 230, error code transfer 240, timer data transfer 250, and additional device data transfer 260. Data transfer 220 transfers an information packet from HMD 130 to main console 110. The packet contains a left-right signal, head position data, and other information regularly and periodically required by main console 110. Command transfer 230 sends command codes or data from main console 110 to HMD 130. Command codes configure the operation of HMD 130. For example, a stereoscopic display may be configured to operate in stereoscopic or monoscopic mode, or a head tracker sensor may be configured to provide all, some, or none of the position angles about the X, Y, and Z axis. Error code transfer 240 transmits error codes from remote devices 120 and 130 to main console 110. The error code may indicate, for example, malfunctions in the HMD or remote devices that are not turned on. Timer data transfer 250 and additional device data transfer 260 transfer data from a timer or an added remote device (not shown).

Transfers 220, 230, 240, 250, and 260 are conducted via bus 115 using an asynchronous protocol. Main console 110 may be a computer or a video game console that was not specifically designed for use in a virtual reality system. Accordingly, communications are via an existing console or computer I/O port, not a port designed specifically for a virtual reality system. The present communications protocol minimizes the number of I/O pins required and permits operation with a video game console through a conventional video game joystick port having only a few I/O pins.

Interface box 120 connects to main console 110 through bus 115 and connects to HMD 130 through cable 125. Interface box 120 includes a microprocessor that executes a program which implements the communications protocol. All other remote devices such as HMD 130 may communicate with interface box 120 so that interface box 120 collects information from all of the remote devices and provides the information to main console 110.

Bus 115 includes three handshake lines and one or more data lines for asynchronous data transfer according to the disclosed protocol. The protocol involves a two step process. The first step is communicating the type of information packet to be transmitted. The second step is transmitting the packet. Main console 110 controls voltages on the first and second of the three handshake lines and provides on each line a binary signal which is either high or low voltage. A remote device (typically the interface box 120) controls the voltage level of the third handshake line. The data lines have a default information transmission direction from the remote device to main console 110. Accordingly, transmission from the remote device to main console 110, the most common direction of transfer in a typical virtual reality system, can be made without reconfiguring the transmission direction.

After determining that an information transfer is required, main console 110 toggles the voltage, i.e. changes the voltage level from high to low or from low to high, on one of the first or second handshake lines. The remote device polls the first and second handshake lines and when a voltage level change on one of the handshake lines is sensed, acknowledges by toggling the voltage on the third handshake line.

A desired information packet is indicated by the pattern in which the first and second lines are toggled. For example, toggling the second handshake line then toggling the first handshake line then toggling the second handshake again may indicate an error code transmission, while toggling the second handshake line twice indicates a different packet such as command code. Because the pattern of toggling and not the particular binary values on the handshake lines indicates the packet, any number of different packets may be distinguished using two handshake lines (three if the line controlled by the remote device is counted). The remaining lines can be used for carrying information from the remote device.

FIG. 2 shows an example of toggling a first and second handshake lines d6 and d5 to identify packet transmission 220, 230, 240, 250, or 260. Initially, the system is in an idle mode 210, and both lines d6 and d5 are high. If main console 110 determines data transfer 220 is needed, then main console 110 drops the voltage on line d6 to low. Interface box 120 senses the drop on line d6. A program executed on the microprocessor in interface box 120 determines that the voltage drop on line d6 indicates data transfer 220, provides the first bits of data on the data lines according to the format for the requested data packet, then toggles a third handshake line d4. As long as line d6 is low, data transfer continues asynchronously via handshaking line d5 for data request signals, handshaking line d4 for data acknowledge signals and the data lines d0–d3 for data signals. The voltages on handshake lines d6 and d5 are then returned to high, and the system is returned to the idle mode.

If the voltage on line d5 is lowered before lowering the voltage on handshake line d6, a non_data mode 225 is requested, but no packet has yet been identified. Interface box 120 lowers the voltage on the third handshake line d4 and waits for a response from main console 110. If main console 110 then raises the voltage on handshake line d5, interface box 120 identifies command code transfer 230 is requested and executes command code transfer 220 according to a predefined format for command code transfers. When the command code transfer is complete, the voltages on lines d6, d5, and d4 are returned to high, and the system returns to idle mode 210.

From the idle mode 210, lowering the voltage on line d5 then lowering the voltage on line d6 indicates a non_command mode 235, but does not identify a packet. From non_command mode 235, raising the voltage on line d5 identifies error code transfer 240. From non_command mode 235, raising the voltage on line d6 indicates a non_error mode 245 but still does not identify a packet. From non_error mode 245, raising the voltage on line d5 indicates additional device data transfer 260, and lowering the voltage on line d6 indicates timer data transfer 250.

FIG. 2 shows only one possible set of toggling patterns for identifying particular types of data packet transfers. Many other data packets can be defined, and many other toggling patterns may be used to identify the packets. Additionally, any data packets may contain information which indicates a further data packet for transmission. For example, additional device transfer 260 may contain information that indicates a second data packet which immediately follows the additional device transfer. Accordingly, many different types of data packets from different types of devices can be identified using the additional device transfer.

In one embodiment of the present invention, main console 110 of FIG. 1 is a SEGA GENESIS™ video game console which executes a virtual reality program provided on a conventional game cartridge or a CD ROM. The SEGA GENESIS™ video game console is commercially available from a wide variety of retail sources. Interface box 120 connects to the second joystick port of the game console.

Figure 3:
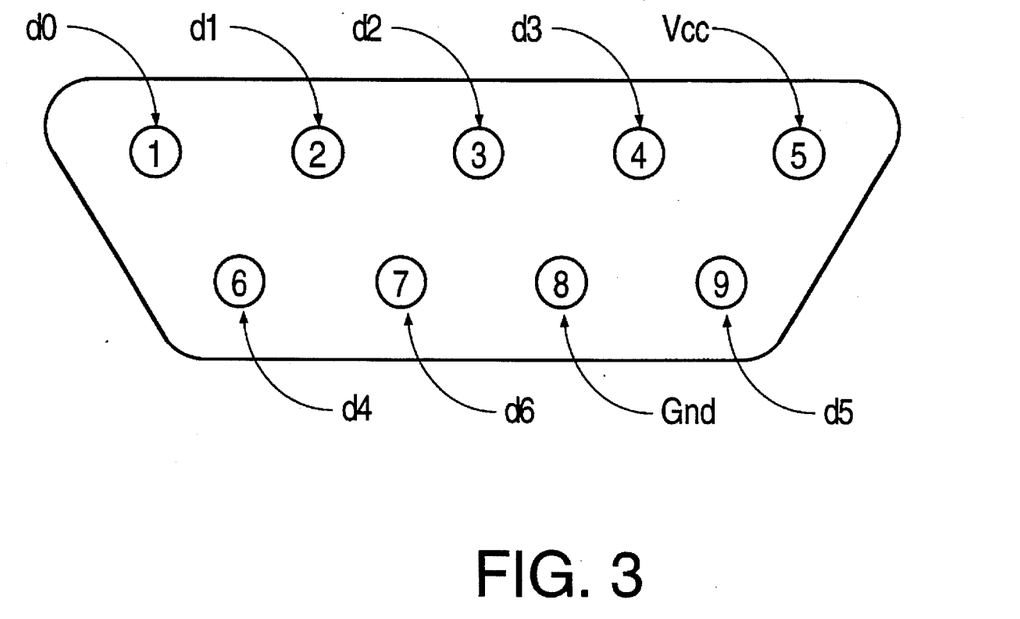
FIG. 3 shows the pins of an I/O port of a SEGA GENESIS™ video game console.

FIG. 3 shows the I/O pins of a joystick port of a SEGA GENESIS™ video game console Pins 5 and 8 of the joystick port carry power supply voltages $V_{cc}$ and ground. The remaining pins 1–4, 7 and 9 are configured for input or output by writing to a configuration register which controls operation of the joystick port. Pins 7 and 9 connect to the first and second handshake lines d6 and d5 of bus 115 and are configured for output from the game console. Pin 6 connects to the third handshake line d4 and is configured for input from the remote device. Pins 1–4 connect to data lines d0—d3 and may be for input or output depending on the information being transferred.

The game console changes voltages on the output lines by writing data (or setting bits) at an address that corresponds to the joystick port. Voltage changes on input lines are sensed by periodically reading (or testing bits) from the joystick port address.

The remote device typically includes a microprocessor which executes a program which polls bus 115, determines the type of information packet requested, and executes a transfer according to a predefined format for the requested packet. In the system of FIG. 1, a single microprocessor in interface box 110 controls communications for all remote devices. Such an interface box is disclosed in the above-referenced U.S. Patent Application entitled "Stereoscopic/Monoscopic Video Display System."

Figure 4:
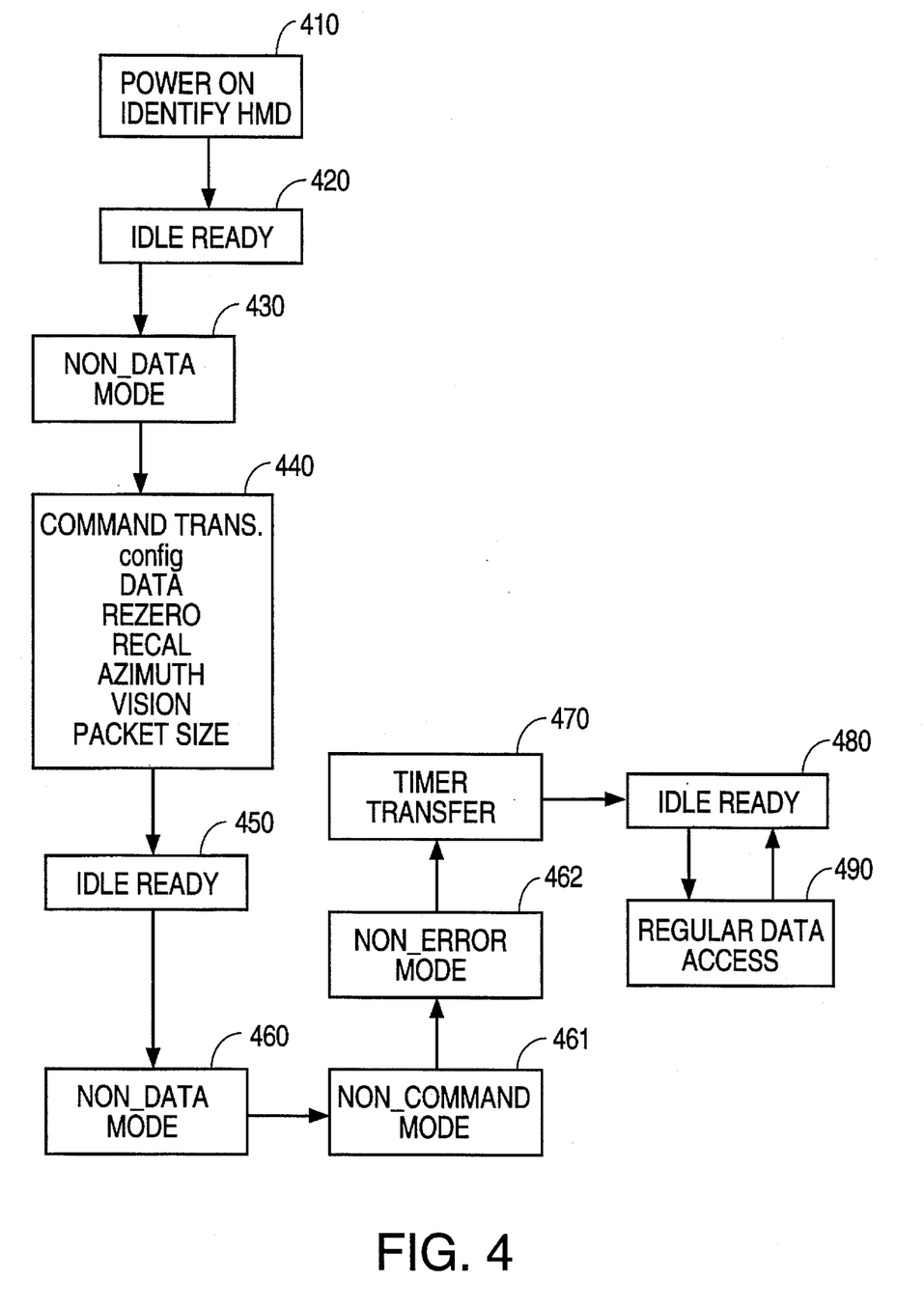
FIG. 4 shows a flow diagram of the operation of a virtual reality system which employs a communications protocol in accordance with the present invention.

FIG. 4 is a flow chart of operation of the virtual reality system including a SEGA GENESIS video game console and an HMD. As disclosed above, the HMD typically communicates with the game console through an interface box. Further, the operation described can be used with remote devices other than an HMD.

Initially, the HMD is connected to the second joystick port of the game console and turned on by the user. The HMD powers up with a default configuration. The typical default configuration has the stereoscopic display in monoscopic mode and the sensors set not to provide any data to the game console. The voltage on handshake line d4 is driven high by the HMD. The voltages on the data lines d3, d2, d1, and d0 are respectively high, low, low, and low.

When powered on at step 410 or reset, the game console executes a game program from a cartridge or CD ROM. If the game program does not contain code necessary for implementing the communication protocol, then no command codes are sent to the HMD, and the HMD stays in default mode. Data line voltages identify that the remote device is not a joystick. For the joystick of a SEGA GENESIS™ video game console, d1 goes low if the down button is pressed, and d0 goes low if the up button is pressed. Since both the up and down button cannot be pressed simultaneously on a properly functioning joystick, a program without protocol capabilities still recognizes that there is no joystick connected to the second joystick port. Accordingly, existing programs do not misinterpret signals from the HMD as joystick signals.

If the program contains code for implementing the protocol, the SEGA GENESIS™ video game console configures the I/O pins by writing a seven bit value to an address corresponding to the joystick configuration register (address 0×A1000B). The second joystick port is configured so that pins 7 and 9 are output pins and pins 6 and pins 1–4 are input pins. I/O pins in the HMD have a complimentary configuration. The game console checks the voltage on handshake line d4 and data lines d3—d0 by reading from the joystick port address (0×A10005). If the voltages are not the expected idle mode voltage, there is no turned-on HMD connected. The game console can either request that the user turn the HMD on or continue operation assuming conventional joystick and television input/output. If the voltages are as expected, both main console 110 and interface box 120 are in idle mode 420, and main console 110 is ready to traverse the tree structure shown in FIG. 2. (The SEGA GENESIS™ video game console powers on in the idle mode.)

To use the HMD in other than the default mode, the game console sends a command to reconfigure the HMD. The first step is requesting a command packet transfer 440. The protocol used by the game console and HMD for sending commands is shown in the following Appendix, wherein lines beginning with "G:" indicate voltages applied to the bus by the game console, and lines beginning with "H:" are voltages applied to the bus by the HMD.

As shown in the Appendix, initially lines d6, d5, and d4 are high. The game console sends a request signal by lowering the voltage on line d5 indicating a non-data mode 430. The HMD senses the signal and acknowledges by lowering d4. In response, the game console requests transmission of a command code by raising d5, and the HMD acknowledges by raising d4.

At this point, the requested data packet has been identified as a command, and transmission of the command begins 440. The direction of information transmission for commands is from the game console to the HMD. Both the game console and HMD must reconfigure their I/O ports so that the HMD receives data on data lines d0–d3. The game console applies voltages to data lines d0–d3 which indicates the first nibble of information and lowers the voltage on line d6 to indicate data is ready. The HMD reads the nibble then lowers line d4 to acknowledge receiving the data.

Command information packets contain five nibbles of information which are transmitted in sequence using lines d5 and d4 for asynchronous request and acknowledge signals. The meaning of the nibbles transferred depends on the order in the sequence. The least significant three bits $C_0$, $C_1$, and $C_2$ of the first nibble indicate whether angles about the Z, Y, or X axis are wanted. Some game programs do not use angular positions about all three axis. By setting $(C_2, C_1, C_0)$ to (1,0,0), for example, the game can request only angles about the X axis. The bits of the second nibble, in order from most to least significant, indicate the HMD magnetometer should be recalibrated according to the strength of the earth's magnetic field at the current location, the HMD should be zeroed so that the angles provided are relative to the current orientation of the HMD, the desired format for angles about the X axis (either 0° to 360° or −180° to 180°), and whether the HMD should be in stereoscopic or monoscopic mode. The third through fifth nibbles and the most significant bit of the first nibble are reserved for future expansion.

After the five nibbles of information are sent, line d6 is low, handshake line d5 is high, and line d4 is low. Both the game console and the HMD reconfigure the data lines d0–d3 for data transmission from the HMD to the game console. The game console raises the voltage on handshake line d6. The HMD senses the voltage change and acknowledges by raising the voltage on handshake line d4. All handshake lines are high, and the system is in idle mode 450 in FIG. 4.

In a system that includes an HMD with a timer, the game console would then configure the a timer using a timer transfer 470. The game console indicates a time transfer by lowering the voltage on line d5 to reach non_data mode 60, lowering the voltage on line d6 to reach non_command mode 461, raising the voltage on line d6 to reach non_error mode 462, and finally lowering the voltage on line d6 to begin timer transfer 470. The HMD responds to each toggling of the voltage on line d5 or d6 by toggling the voltage on line d4. After timer transfer 470, d5 and d6 are returned to high and idle mode 480 is reached.

From idle mode 480, the game console can request data from the HMD 490, request an error code, request a timer transfer, request an additional device transfer, or request another command transfer. Most common is a request of data from the HMD because HMD data packets contain the information, such as left-right video control signals and angular data from the sensors, which is regularly required by the game console. Such request would typically be made at least during every vertical blanking interval of the display so that the game console can determine the next frame of video information that is sent to the HMD.

The Appendix shows the protocol for transferring data from the HMD. The type of data packet transferred depends on the configuration of the HMD. When the HMD is configured to provide only some of the possible angular information, the data packet is shortened by deleting the data not requested. Both the game console and the HMD keep track of the HMD configuration and use the HMD configuration to determine the length of the data packet.

From the idle mode 480, data transfers 490 begin with the game console lowering line d6 to low. The HMD responds by applying voltages representing the first nibble of data to data lines d0–d3 and lowering line d4. The three least significant bits of the first nibble indicate if the HMD has experienced an error, whether the HMD is currently displaying a left or a right view for a stereoscopic image (a left-right signal), and whether the HMD is in stereoscopic or monoscopic mode.

The remaining nibbles of the data packet provide angular information. Each nibble is preceded by an acknowledge signal on line d4 which is given only when data on lines d0–d3 is valid. In the case where only angles about the X axis are used, three nibbles provide a 12-bit X value. In other configurations of the HMD, various combinations of X, Y, and Z values are provide as shown in the Appendix.

For data packets with an even number of nibbles, for example the packets that only contain X angular data, both lines d6 and d5 are low, and line d4 is high when the last angular data is transmitted. A extra handshaking cycle is used to place the handshake lines back in the idle mode. One of the line d5 is raised high and acknowledged by line d4 going low, then line d6 is raised and acknowledged by line d4 going high. The final toggling of the handshake lines does not transfer data but does synchronize the lines so that all the handshake lines are high at once. Further, the voltage on only one handshake line changes at a time. Attempting to toggle two handshake lines simultaneously can result in errors caused by the HMD recognizing voltage changes on one line first.

If the error bit is set in a data packet from the HMD, the game console may request an error code according to the protocol in the appendix. A list of examples of error codes is provided in the appendix. Protocols for timer packets and additional device packets are provided for compatibility with remote devices that may be added to the virtual reality system in the future. The protocols for timer data and additional device data are in the Appendix.

Although the present invention has been described with reference to particular embodiments, the description is only an example of the invention's application and should not be taken as a limitation. In particular, the communications protocols according to the present invention are not limited to use with a SEGA GENESIS™ video game console and not limited to use in a virtual reality system. Rather, the invention is more generally applicable to any devices communicating over a bus. Further, the present invention is not limited to particular types of information, particular formats for information packets, nor particular toggling patterns. Information, formats, and toggling patterns of a limitless variety may be transmitted using protocols in accordance with the present invention.

| Appendix | | | | | | | |
|---|---|---|---|---|---|---|---|
| Initial port setting of the head mounted display: | | | | | | | |
| | d6(TH) in | d5(TR) in | d4(TL) out | d3 out | d2 out | d1 out | d0 out |
| Data lines d3–d0 contain a data nibble. Initial game console port settings: | | | | | | | |
| | d6(TH) out | d5(TR) out | d4(TL) in | d3 in | d2 in | d1 in | d0 in |
| INTERRUPTS ALLOWED IDLE MODE | | | | | | | |
| G: Idle_req | 1 | 1 | — | — | — | — | — |
| H: Idle_ack Generic DATA ACCESS data request | — | — | 1 | 1 | 0 | 0 | 0 |
| Idle_rdy | 1 | 1 | 1 | 1 | ·0 | 0 | 0 | both sides are idle |
| G: stat_req | 0 | 1 | — | — | — | — | — |

Appendix -continued

| | | | | | | | | |
|---|---|---|---|---|---|---|---|---|
| H: stat_ack | — | — | 0 | rsv | E | L/R | S/M | |
| G: data1_req | 0 | 0 | — | — | — | — | — | |
| H: data1_ack | — | — | 1 | | data | | | first data nibble |
| G: datan_req | 0 | 1 | — | — | — | — | — | |
| H: datan_ack | — | — | 0 | | data | | | |
| G: data_last_req | 0 | 0 | — | — | — | — | — | |
| H: data_last_ack | — | — | 1 | | data | | | last data nibble |
| G: sync_req | 0 | 1 | — | — | — | — | — | |
| H: sync_ack | — | — | 0 | 1 | 0 | 0 | 0 | |
| G: Idle_req | 1 | 1 | — | — | — | — | — | |
| H: Idle_ack | — | — | 1 | 1 | 0 | 0 | 0 | both sides are idle |

DATA ACCESS, X&Y&Z
data request

| | | | | | | | | |
|---|---|---|---|---|---|---|---|---|
| Idle_rdy | 1 | 1 | 1 | 1 | 0 | 0 | 0 | both sides are idle |
| G: stat_req | 0 | 1 | — | — | — | — | — | |
| H: stat_ack | — | — | 0 | rsv | E | L/R | S/M | |
| G: data1_req | 0 | 0 | — | — | — | — | — | |
| H: data1_ack | — | — | 1 | X11 | X10 | X9 | X8 | |
| G: data2_req | 0 | 1 | — | — | — | — | — | |
| H: data2_ack | — | — | 0 | X7 | X6 | X5 | X4 | |
| G: data3_req | 0 | 0 | — | — | — | — | — | |
| H: data3_ack | — | — | 1 | X3 | X2 | X1 | X0 | |
| G: data4_req | 0 | 1 | — | — | — | — | — | |
| H: data4_ack | — | — | 0 | Y7 | Y6 | Y5 | Y4 | |
| G: data5_req | 0 | 0 | — | — | — | — | — | |
| H: data5_ack | — | — | 1 | Y3 | Y2 | Y1 | Y0 | |
| G: data6_req | 0 | 1 | — | — | — | — | — | |
| H: data6_ack | — | — | 0 | Z7 | Z6 | Z5 | Z4 | |
| G: data7_req | 0 | 0 | — | — | — | — | — | |
| H: data7_ack | — | — | 1 | Z3 | Z2 | Z1 | Z0 | |
| G: sync_req | 0 | 1 | — | — | — | — | — | |
| H: sync_ack | — | — | 0 | 1 | 0 | 0 | 0 | |
| G: Idle_req | 1 | 1 | — | — | — | — | — | |
| H: Idle_ack | — | — | 1 | 1 | 0 | 0 | 0 | both sides are idle |

DATA ACCESS, X DATA ONLY
data request

| | | | | | | | | |
|---|---|---|---|---|---|---|---|---|
| Idle_rdy | 1 | 1 | 1 | 1 | 0 | 0 | 0 | both sides are idle |
| G: stat_req | 0 | 1 | — | — | — | — | — | |
| H: stat_ack | — | — | 0 | rsv | E | L/R | S/M | |
| G: data1_req | 0 | 0 | — | — | — | — | — | |
| H: data1_ack | — | — | 1 | X11 | X10 | X9 | X8 | |
| G: data2_req | 0 | 1 | — | — | — | — | — | |
| H: data2_ack | — | — | 0 | X7 | X6 | X5 | X4 | |
| G: data3_req | 0 | 0 | — | — | — | — | — | |
| H: data3_ack | — | — | 1 | X3 | X2 | X1 | X0 | |
| G: sync_req | 0 | 1 | — | — | — | — | — | |
| H: sync_ack | — | — | 0 | 1 | 0 | 0 | 0 | |
| G: Idle_req | 1 | 1 | — | — | — | — | — | |
| H: Idle_ack | — | — | 1 | 1 | 0 | 0 | 0 | both sides are idle |

DATA ACCESS, X&Y DATA
data request

| | | | | | | | | |
|---|---|---|---|---|---|---|---|---|
| Idle_rdy | 1 | 1 | 1 | 1 | 0 | 0 | 0 | both sides are idle |
| G: stat_req | 0 | 1 | — | — | — | — | — | |
| H: stat_ack | — | — | 0 | rsv | E | L/R | S/M | |
| G: data1_req | 0 | 0 | — | — | — | — | — | |
| H: data1_ack | — | — | 1 | X11 | X10 | X9 | X8 | |
| G: data2_req | 0 | 1 | — | — | — | — | — | |
| H: data2_ack | — | — | 0 | X7 | X6 | X5 | X4 | |
| G: data3_req | 0 | 0 | — | — | — | — | — | |
| H: data3_ack | — | — | 1 | X3 | X2 | X1 | X0 | |
| G: data4_req | 0 | 1 | — | — | — | — | — | |
| H: data4_ack | — | — | 0 | Y7 | Y6 | Y5 | Y4 | |
| G: data5_req | 0 | 0 | — | — | — | — | — | |
| H: data5_ack | — | — | 1 | Y3 | Y2 | Y1 | Y0 | |
| G: sync_req | 0 | 1 | — | — | — | — | — | |
| H: sync_ack | — | — | 0 | 1 | 0 | 0 | 0 | |
| G: Idle_req | 1 | 1 | — | — | — | — | — | |
| H: Idle_ack | — | — | 1 | 1 | 0 | 0 | 0 | both sides are idle |

DATA ACCESS, X&Z DATA
data request

| | | | | | | | | |
|---|---|---|---|---|---|---|---|---|
| Idle_rdy | 1 | 1 | 1 | 1 | 0 | 0 | 0 | both sides are idle |
| G: stat_req | 0 | 1 | — | — | — | — | — | |
| H: stat_ack | — | — | 0 | rsv | E | L/R | S/M | |
| G: data1_req | 0 | 0 | — | — | — | — | — | |

| | | | | | | | | |
|---|---|---|---|---|---|---|---|---|
| H: data1_ack | — | — | 1 | X11 | X10 | X9 | X8 | |
| G: data2_req | 0 | 1 | — | — | — | — | — | |
| H: data2_ack | — | — | 0 | X7 | X6 | X5 | X4 | |
| G: data3_req | 0 | 0 | — | — | — | — | — | |
| H: data3_ack | — | — | 1 | X3 | X2 | X1 | X0 | |
| G: data4_req | 0 | 1 | — | — | — | — | — | |
| H: data4_ack | — | — | 0 | Z7 | Z6 | Z5 | Z4 | |
| G: data5_req | 0 | 0 | — | — | — | — | — | |
| H: data5_ack | — | — | 1 | Z3 | Z2 | Z1 | Z0 | |
| G: sync_req | 0 | 1 | — | — | — | — | — | |
| H: sync_ack | — | — | 0 | 1 | 0 | 0 | 0 | |
| G: Idle_req | 1 | 1 | — | — | — | — | — | |
| H: Idle_ack | — | — | 1 | 1 | 0 | 0 | 0 | both sides are idle |

DATA ACCESS, Y&Z DATA
data request

| | | | | | | | | |
|---|---|---|---|---|---|---|---|---|
| G: Idle_rdy | 1 | 1 | 1 | 1 | 0 | 0 | 0 | both sides are idle |
| G: stat_req | 0 | 1 | — | — | — | — | — | |
| H: stat_ack | — | — | 0 | rsv | E | L/R | S/M | |
| G: data1_req | 0 | 0 | — | — | — | — | — | |
| H: data1_ack | — | — | 1 | Y7 | Y6 | Y5 | Y4 | |
| G: data2_req | 0 | 1 | — | — | — | — | — | |
| H: data2_ack | — | — | 0 | Y3 | Y2 | Y1 | Y0 | |
| G: data3_req | 0 | 0 | — | — | — | — | — | |
| H: data3_ack | — | — | 1 | Z7 | Z6 | Z5 | Z4 | |
| G: data4_req | 0 | 1 | — | — | — | — | — | |
| H: data4_ack | — | — | 0 | Z3 | Z2 | Z1 | Z0 | |
| G: Idle_req | 1 | 1 | — | — | — | — | — | |
| H: Idle_ack | — | — | 1 | 1 | 0 | 0 | 0 | both sides are idle |

DATA ACCESS, Y DATA
data request

| | | | | | | | | |
|---|---|---|---|---|---|---|---|---|
| G: Idle_rdy | 1 | 1 | 1 | 1 | 0 | 0 | 0 | both sides are idle |
| G: stat_req | 0 | 1 | — | — | — | — | — | |
| H: stat_ack | — | — | 0 | rsv | E | L/R | S/M | |
| G: data1_req | 0 | 0 | — | — | — | — | — | |
| H: data1_ack | — | — | 1 | Y7 | Y6 | Y5 | Y4 | |
| G: data2_req | 0 | 1 | — | — | — | — | — | |
| H: data2_ack | — | — | 0 | Y3 | Y2 | Y1 | Y0 | |
| G: Idle_req | 1 | 1 | — | — | — | — | — | |
| H: Idle_ack | — | — | 1 | 1 | 0 | 0 | 0 | both sides are idle |

DATA ACCESS, Z DATA
data request

| | | | | | | | | |
|---|---|---|---|---|---|---|---|---|
| G: Idle_rdy | 1 | 1 | 1 | 1 | 0 | 0 | 0 | both sides are idle |
| G: stat_req | 0 | 1 | — | — | — | — | — | |
| H: stat_ack | — | — | 0 | rsv | E | L/R | S/M | |
| G: data1_req | 0 | 0 | — | — | — | — | — | |
| H: data1_ack | — | — | 1 | Z7 | Z6 | Z5 | Z4 | |
| G: data2_req | 0 | 1 | — | — | — | — | — | |
| H: data2_ack | — | — | 0 | Z3 | Z2 | Z1 | Z0 | |
| G: Idle_req | 1 | 1 | — | — | — | — | — | |
| H: Idle_ack | — | — | 1 | 1 | 0 | 0 | 0 | both sides are idle |
| STATUS NIBBLE | — | — | 0 | rsv | E | L/R | S/M | | rsv    reserved
E      0(no errors); 1(some error) ERROR FLAG
L/R    don't care if S/M=0 else 0(left eye); 1(right eye) HMD display status
S/M    0(MONO); 1(STEREO)vision

COMMAND MODE TRANSFER
NO INTERRUPTS ALLOWED

| | | | | | | | | |
|---|---|---|---|---|---|---|---|---|
| Idle_rdy | 1 | 1 | 1 | 1 | 0 | 0 | 0 | both sides are idle |
| G: non_data_req | 1 | 0 | — | — | — | — | — | |
| H: non_data_ack | — | — | 0 | 0 | 0 | 0 | 0 | |
| G: FMT_req | 1 | 1 | — | — | — | — | — | |
| H: FMT_ack | — | — | 1 | 0 | 0 | 0 | 0 | |

AT THIS POINT BOTH GAME CONSOLE AND HMD SWITCH PORT SETTING
Port setting for the HMD

| | d6(TH) | d5(TL) | d4(TR) | d3 | d2 | d1 | d0 |
|---|---|---|---|---|---|---|---|
| | in | in | out | in | in | in | in |
| | | | | bits d3–d0 contain command nibbles | | | |

Port setting for the game console

| | d6(TH) | d5(TL) | d4(TR) | d3 | d2 | d1 | d0 | |
|---|---|---|---|---|---|---|---|---|
| | out | out | in | out | out | out | out | |
| G: cfg_com_req | 0 | 1 | — | rsv | $C_2$ | $C_1$ | $C_0$ | First command nibble |
| H: HMD_com_ack | — | — | 0 | — | — | — | — | |

-continued

Appendix

| | | | | | | | | |
|---|---|---|---|---|---|---|---|---|
| G: stat_com_req | 0 | 0 | — | RC | RZ | AZ | S/M | Second command nibble |
| H: HMD_stat_ack | — | — | 1 | — | — | — | — | |
| G: rsv_com_req | 0 | 1 | — | r11 | r10 | r9 | r8 | reserved |
| H: HMD_rsv_ack | — | — | 0 | — | — | — | — | |
| G: rsv_com1_req | 0 | 0 | — | r7 | r6 | r5 | r4 | |
| H: HMD_rsv1_ack | — | — | 1 | — | — | — | — | |
| G: rsv_com2_req | 0 | 1 | — | r3 | r2 | r1 | r0 | |
| H: HMD_rsv2_ack | — | — | 0 | — | — | — | — | |

AT THIS POINT BOTH GAME CONSOLE AND HMD SWITCH BACK TO INITIAL PORT SETTING

Port setting on the HMD:

| | d6(TH) | d5(TR) | d4(TL) | d3 | d2 | d1 | d0 |
|---|---|---|---|---|---|---|---|
| | in | in | out | out | out | out | out |
| | | | | bits d3–d0 contain data nibble. | | | |

Port setting on the game console slave mode

| | d6(TH) | d5(TR) | d4(TL) | d3 | d2 | d1 | d0 |
|---|---|---|---|---|---|---|---|
| | out | out | in | in | in | in | in |
| G: end_com_req | 1 | 1 | — | — | — | — | — |
| H: HMD_end_ack | — | — | 1 | 1 | 0 | 0 | 0 | both sides are idle |

COMMAND TABLES
First command nibble

C$_3$ C$_2$ C$_1$ C$_0$
rsv  X  Y  Z

C$_2$–C$_0$
000 reserved (don't care)
001 Z data
010 Y data
011 Z & Y data
100 X data
101 X & Z data
110 X & Y data
111 X & Y & Z data Defination of bits sent in second command nibble
RC  = 1 recalibrate the HMD
AZ  = 0 (0...359); 1(+/– 180) Azimuth angle format.
RZ  = 1 rezero the Head Tracker
S/M = 1 stereoscopic mode; 0 monoscopic mode

ADDITIONAL DEVICE SETUP

| | | | | | | | | |
|---|---|---|---|---|---|---|---|---|
| G: Idle_rdy | 1 | 1 | 1 | 1 | 0 | 0 | 0 | both sides are idle |
| G: non_data_req | 1 | 0 | — | — | — | — | — | |
| H: non_data_ack | — | — | 0 | 0 | 0 | 0 | 0 | |
| G: non_fmt_req | 0 | 0 | — | — | — | — | — | |
| H: non_fmt_ack | — | — | 1 | 0 | 0 | 0 | 0 | |
| G: timer_req | 1 | 0 | — | — | — | — | — | |
| H: timer_ack | — | — | 0 | 0 | 0 | 0 | 0 | |

AT THIS POINT BOTH GAME CONSOLE AND HMD SWITCH PORT SETTING
port setting on the HMD

| | d6(TH) | d5(TL) | d4(TR) | d3 | d2 | d1 | d0 |
|---|---|---|---|---|---|---|---|
| | in | in | out | in | in | in | in |
| | | | | bits d3–d0 contain command nibbles | | | |

Corresponding port setting on the game console master mode

| | d6(TH) | d5(TL) | d4(TR) | d3 | d2 | d1 | d0 | |
|---|---|---|---|---|---|---|---|---|
| | out | out | in | out | out | out | out | |
| G: rsv_dev_ack | 0 | 0 | — | x | x | x | x | |
| nop | | | | | | | | |
| H: HMD_dev_ack | — | — | 1 | — | — | — | — | |
| G: cfg_device | 0 | 1 | — | d15 | d14 | d13 | d12 | high nibble |
| nop | | | | | | | | |
| H: cfg_ack | — | — | 0 | — | — | — | — | |
| G: cfg2_device | 0 | 0 | — | d11 | d10 | d9 | d8 | |
| nop | | | | | | | | |
| H: cfg2_ack | — | — | 1 | — | — | — | — | |
| G: cfg3_device | 0 | 1 | — | d7 | d6 | d5 | d4 | |
| nop | | | | | | | | |
| H: cfg3_ack | — | — | 0 | — | — | — | — | |
| g: cfg4_device | 0 | 0 | — | d3 | d2 | d1 | d0 | lowest nibble |
| nop | | | | | | | | |
| H: cfg4_ack | — | — | 1 | — | — | — | — | |
| G: rsv_req | 0 | 1 | — | r3 | r2 | r1 | r0 | |
| H: rsv_ack | — | — | 0 | — | — | — | — | |

-continued

Appendix

AT THIS POINT BOTH GAME CONSOLE AND HMD SWITCH BACK TO THE INITIAL PORT SETTING

Port setting on the HMD:

|  | d6(TH) in | d5(TR) in | d4(TL) out | d3 out | d2 out | d1 out | d0 out |  |
|---|---|---|---|---|---|---|---|---|
|  |  |  |  | bits d3–d0 contain data nibble. |  |  |  |  |

Port setting on the game console slave mode

|  | d6(TH) out | d5(TR) out | d4(TL) in | d3 in | d2 in | d1 in | d0 in |  |
|---|---|---|---|---|---|---|---|---|
| G: end_com_re | 1 | 1 | — | — | — | — | — |  |
| H: HMD_end_ack | — | — | 1 | 1 | 0 | 0 | 0 | both sides are idle |
| ERRORS |  |  |  |  |  |  |  |  |
| Idle_rdy | 1 | 1 | 1 | 1 | 0 | 0 | 0 | both sides are idle |
| G: non_data_req | 1 | 0 | — | — | — | — | — |  |
| H: non_data_ack | — | — | 0 | 0 | 0 | 0 | 0 |  |
| G: non_fmt_req | 0 | 0 | — | — | — | — | — |  |
| H: non_fmt_ack | — | — | 1 | 0 | 0 | 0 | 0 |  |
| G: err_stat_req | 0 | 1 | — | — | — | — | — |  |
| H: err_stat_ack | — | — | 0 | 0 | 0 | 0 | 0 |  |
| G: err1_req | 0 | 0 | — | — | — | — | — |  |
| H: err1_ack | — | — | 1 | e15 | e14 | e13 | e12 |  |
| G: err2_req | 0 | 1 | — | — | — | — | — |  |
| H: err2_ack | — | — | 0 | e11 | e10 | d9 | d8 |  |
| G: err3_req | 0 | 0 | — | — | — | — | — |  |
| H: err3_ack | — | — | 1 | e7 | e6 | e5 | e4 |  |
| G: err4_req | 0 | 1 | — | — | — | — | — |  |
| H: err4_ack | — | — | 0 | e3 | e2 | e1 | e0 |  |
| G: Idle_req | 1 | 1 | — | — | — | — | — |  |
| H: Idle_ack | — | — | 1 | 1 | 0 | 0 | 0 | both sides are idle |

TABLE OF ERROR CODES

| Error bits: | e3 | e2 | e1 | e0 | driver saves this value to variable in memory |
|---|---|---|---|---|---|
|  | 0 | 0 | 0 | 0 | no errors |
|  | 0 | 0 | 0 | 1 | no video from game console to the interface box |
|  | 0 | 0 | 1 | 0 | no video from interface both to the HMD |
|  | 0 | 0 | 1 | 1 | no audio from game console to the interface box |
|  | 0 | 1 | 0 | 0 | no audio from interface box to HMD |
|  | 0 | 1 | 0 | 1 | no power to the HMD |
|  | 0 | 1 | 1 | 0 | LCD display not functioning |
|  | 0 | 1 | 1 | 1 | Splitter not functioning |
|  | 1 | 0 | 0 | 0 | Head Tracker not working |
|  | 1 | 0 | 0 | 1 | reserved |
|  | 1 | 0 | 0 | 1 | reserved |
|  | 1 | 0 | 1 | 1 | reserved |
|  | 1 | 0 | 0 | 1 | reserved |
|  | 1 | 1 | 0 | 0 | reserved |
|  | 1 | 1 | 0 | 1 | reserved |
|  | 1 | 1 | 1 | 1 | reserved |

We claim:

1. A method for transferring information, comprising the steps of:

connecting a first device to a second device via a bus having at least a first, second, and third handshake lines and at least one data line;

toggling voltages on the first and second handshake lines, wherein the first device controls toggling of the first and second handshake lines, and toggling of the first handshake line is interspersed with toggling of the second handshake line in a pattern that indicates a type of data packet;

sensing, by the second device, of each toggling of voltage of the first and second handshake lines;

toggling a voltage on the third handshake line, wherein the second device controls the toggling on the third handshake line and each toggling on the third handshake line is after sensing of toggling on the first or second handshake line; and transferring information signals on the data line, wherein the information signals represent a data packet of the type indicated by the pattern of toggling of the first and second handshake lines.

2. The method of claim 1, wherein toggling changes voltage from a level indicating one of two binary values, 0 or 1, to a level indicating the other of the two binary values, 1 or 0.

3. The method of claim 1, wherein the sensing step further comprises polling the first and second handshake lines to sense the toggling of voltage.

4. A method for transferring information, comprising the steps of:

connecting a first device to a second device via a bus having at least a first, second, and third handshake lines and at least one data line;

toggling a voltage on the first handshake line J times, wherein J≧0;

toggling a voltage on the second handshake line K times, wherein K≧0, J+K≧1, and toggling of the first handshake line is interspersed with toggling of the second handshake line in a pattern controlled by the first device;

sensing, by the second device, of each toggling of voltage on the first and second handshake lines;

toggling a voltage on the third handshake line J+K times, wherein the second device controls the toggling of the third handshake line and each toggling on the third handshake line is after sensing of toggling on the first or second handshake line; and transferring information signals on the data line wherein J, K, and the pattern of toggling of the first and second handshake lines determine the type of information transferred, wherein the first device is a main console of a virtual reality system and the second device is a remote device.

5. The method of claim 4, wherein the connecting step further comprises connecting the bus to a joystick port of the main console.

6. The method of claim 4 wherein the remote device further comprises an interface box for coupling to a sensor adapted for body mounting, and the transferring step further comprises:

transferring sensor data from the sensor to the interface box; and transferring the sensor data from the interface box to the main console if the pattern of toggling indicates the main console is requesting data from the sensor.

7. The method of claim 4 wherein the remote device further comprises an interface box for coupling to a stereoscopic video display, and the transferring step further comprises:

transferring, from the stereoscopic video display to the interface box, data which indicates whether a left or a right view is currently being displayed by the stereoscopic video display; and transferring the data from the interface box to the main console if the pattern of toggling indicates the main console is requesting data from the stereoscopic display.

8. The method of claim 4 wherein the remote device further comprises an interface box for coupling to a sensor adapted for body mounting and a stereoscopic video display, and the transferring step further comprises:

transferring sensor data from the sensor to the interface box;

transferring, from the stereoscopic video display to the interface box, data which indicates whether a left or a right view is currently being displayed by the stereoscopic video display; and transferring a data packet from the interface box to the main console, wherein the data packet includes the sensor data from the sensor and data from the stereoscopic video display.

9. A method for transferring information, comprising:

connecting a first device to a second device via a bus having at least a first, second, and third handshake lines and at least one data line;

toggling voltages on the first and second handshake lines, wherein the first device controls toggling of the first and second handshake lines, and toggling of the first handshake line is interspersed with toggling of the second handshake line in a pattern that indicates a type of data packet;

sensing, by the second device, of each toggling of voltage of the first and second handshake lines;

toggling a voltage on the third handshake line, wherein the second device controls the toggling on the third handshake line and each toggling on the third handshake line is after sensing of toggling on the first or second handshake line; and transferring information signals on the data line, wherein the information signals represent a data packet of the type indicated by the pattern of toggling of the first and second handshake lines and transferring the information signals comprises:

applying voltages, by the second device, on the data line wherein the voltages represent information requested by the first device;

toggling, by the second device, the voltage on the third handshake line;

sensing, by the first device, of the toggling of the third handshake line;

reading, by the first device, of the voltages on the data line; and toggling, by the first device, of the voltage on one of the first and second handshake lines.

10. The method of claim 9, wherein the transferring step further comprises repeating the steps of claim 9 a predetermined number of times, wherein the predetermined number depends on the pattern of toggling of the first and second handshake lines.

11. A method for transferring information between a main console and a remote device in a virtual reality system, the method comprising:

connecting the main console to the remote device via a bus having a first, second, and third handshake lines and at least one data line;

toggling, by the main console, of voltages on the first and second handshake lines, wherein the toggling has a pattern which indicates a type of data packet;

sensing, by the remote device, of the toggling of voltages on the first and second handshake lines;

toggling, by the remote device, of a voltage on the third handshake line, wherein each toggling on the third handshake line is in response to sensing of toggling on the first or second handshake line; and asynchronously transmitting information signals on the data line while using the first and third handshake lines to carry request and acknowledge signals, wherein the information signals represent a data packet of the type indicated by the toggling of the first and second handshake lines.

12. A method for transferring information between a main console and a remote device in a virtual reality system, the method comprising:

connecting the main console to the remote device via a bus connected to a joystick port of the main console; the bus having a first, second, and third handshake lines and at least one data line;

toggling, by the main console, of voltages on the first and second handshake lines, wherein the toggling has a pattern which indicates a type of data packet;

sensing, by the remote device, of the toggling of voltages on the first and second handshake lines;

toggling, by the remote device, of a voltage on the third handshake line, wherein each toggling on the third handshake line is in response to sensing of toggling on the first or second handshake line; and generating information signals on the data line, wherein the information signals represent a data packet of the type indicated by toggling of the first and second handshake lines.

13. A method for transferring information between a main console and a remote device in a virtual reality system, the comprising:
   connecting the main console to the remote device via a bus having a first, second, and third handshake lines and at least one data line, wherein the remote device comprises an interface box;
   toggling, by the main console, of voltages on the first and second handshake lines, wherein the toggling has a pattern which indicates a type of data packet;
   sensing, by the remote device, of the toggling of voltages on the first and second handshake lines;
   toggling, by the remote device, of a voltage on the third handshake line, wherein each toggling on the third handshake line is in response to sensing of toggling on the first or second handshake line; and
   generating information signals on the data line, wherein the information signals represent a data packet of the type indicated by toggling of the first and second handshake lines.

14. The method of claim 13, wherein the remote device further comprises a sensor adapted for body mounting and coupled to the interface box.

15. The method of claim 13, wherein the remote device further comprises a stereoscopic display coupled to the interface box.

16. The method of claim 1, wherein the first device is in a computer system for processing video images, and the second device is in a remote image display.

* * * * *